Sept. 22, 1931.  R. SCHROEDER  1,823,956
SECTIONAL MANDREL
Filed Feb. 25, 1927
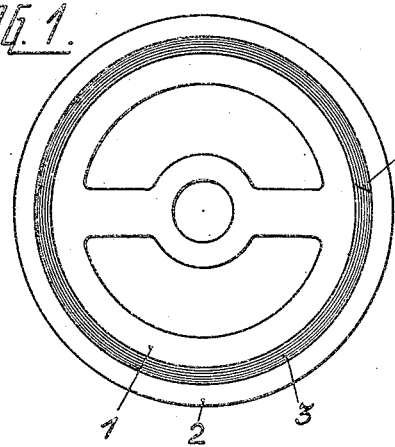
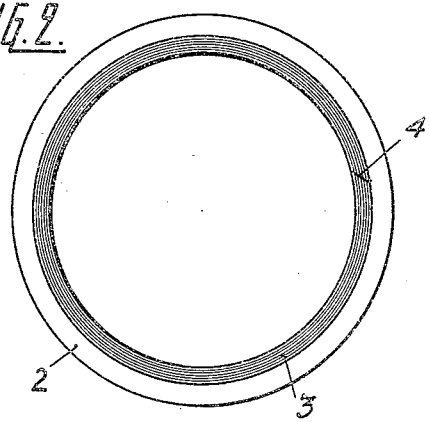
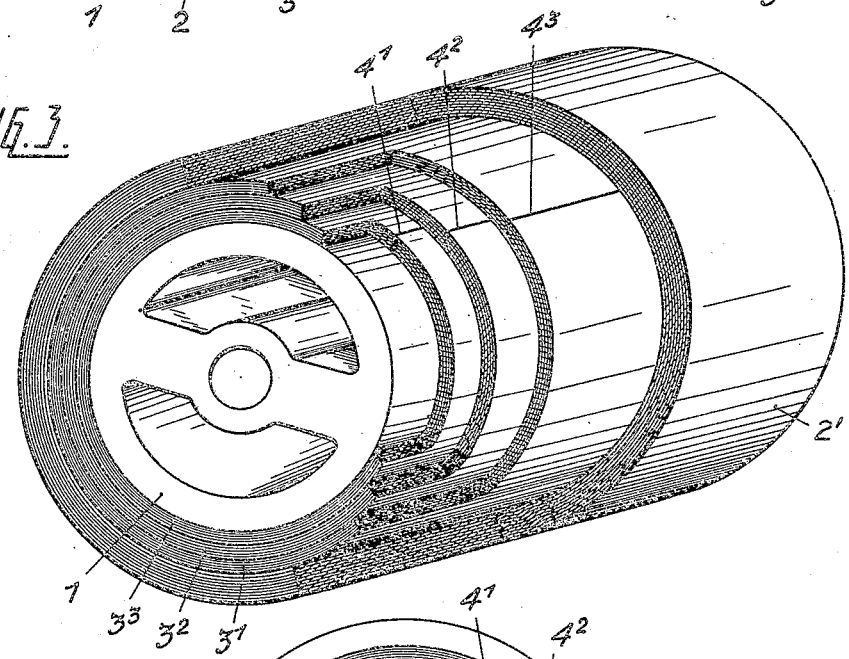
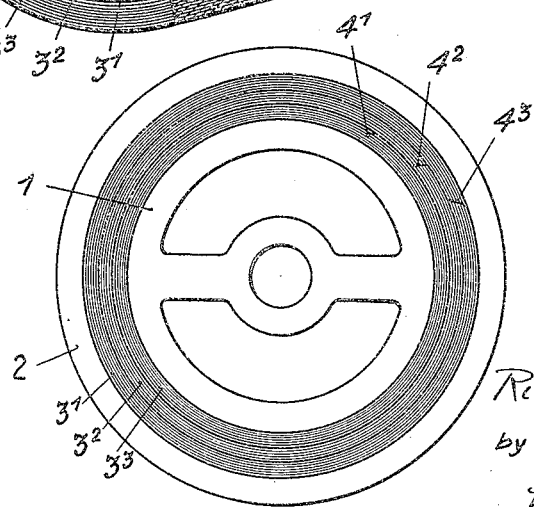
Inventor:
Richard Schroeder
by
his Atty.

Patented Sept. 22, 1931

1,823,956

UNITED STATES PATENT OFFICE

RICHARD SCHROEDER, OF BERLIN-WEISSENSEE, GERMANY

SECTIONAL MANDREL

Application filed February 25, 1927, Serial No. 170,931, and in Germany March 5, 1926.

My invention has reference to improvements in the manufacture of hollow cylinders of suitable cross sectional shape by a winding process by means of which layers of flexible fibrous or textile material which has been preferably submitted to a previous treatment with natural or artificial resins or gums are placed upon a metallic mandrel by a winding operation with the simultaneous employment of pressure and heat, the outer dimensions of such mandrel corresponding to the desired interior dimensions of the cylinders to be obtained. In the manufacture of such cylinders which are, for instance, used for insulating purposes, there arises the difficulty that the outer surface of the mandrels which are ordinarily made of cast iron or wrought iron, must be very carefully prepared; the mandrel must be very accurately and smoothly turned off, for instance, and must be subsequently ground and polished, so as to yield an entirely unobjectionable product. This treatment renders such mandrels of course very expensive, particularly so, because the thickness of the walls of the mandrels must be quite considerable on account of the great compressive strain during the winding operation. It would, therefore, entail excessive costs, and moreover would require an undue amount of space for the manufacturer to keep a large amount of mandrels in stock to correspond to all possible inner diameters of such insulating cylinders or the like, even for the sizes rarely used. It has, therefore, been suggested to manufacture insulating cylinders of other interior diameters than the standard size and to use mandrels of standard diameters and firstly mount an insert or intermediate layer upon the winding mandrel of the next smallest size available, so as to enlarge the mandrel to the desired interior diameter, the insulating cylinder proper being then wound upon said intermediate insert. Such inserts were usually either manufactured from unvarnished paper, in which case the result was unsatisfactory, or the insert was made from the same raw material as the insulating cylinder, for instance, of varnished or japanned paper. These inserts had to be subsequently peeled out or withdrawn from the finished insulating cylinders, or the like, and were usually thrown away, because only rarely could the insert be withdrawn from the finished insulating cylinder sufficiently intact to allow of its being re-used, so that the method referred to resulted in great losses of material and labor.

Now, the object of the present invention is to produce inserts or intermediate pieces which may be used almost indefinitely and which present the additional advantage of easy manipulation, and a great reduction in the costs of storage, combined with highly satisfactory results in the wound material.

In accordance with this invention, inserts or intermediate pieces of substantially hollow cylindrical shape are used for this purpose which are made of substantially durable material and which are split or slit along a line running longitudinally on their outer surface, or approximately along such line, the slit extending in the radial direction or in a direction at an angle to the radial plane. Such hollow cylinders are mounted upon the mandrel either singly or superimposedly, and after having been surrounded with the wound layers of material, and after said layers have been baked, they are withdrawn from the mandrel together with the wound cylinder. From the finished insulating cylinder the inserts referred to may be easily withdrawn, without any danger of injuring the inner walls of the finished cylinders because of the resiliency and elasticity of the insert produced by the slitting thereof and because of the use of some suitable means to prevent sticking of the inner layer of the hollow cylinder to the outer face of the mandrel in the event the material from which the hollow cylinder is wound is impregnated with a substance which is inherently adhesive or becomes adhesive during baking of the cylinder. Such inserts or intermediate pieces may be made of any suitable material, for instance, metal. But in a preferred embodiment of the invention they are made of paper or sheets or webs of fabric and resin, particularly artificial resin, and they are split open after having been dried and baked to a finish. Inasmuch as these inserts are used over again, it becomes possible to produce cylinders of all possible diameters with a comparatively small stock of metal mandrels and a comparatively small stock of inserts. For this purpose it will only be necessary to keep a stock of mandrels with relatively large differences of diameter, say about 20 to 40 millimeters differences of diameter (0.8 inch to 1½ inch), while for obtaining the intermediate diameters slitted inserts are provided with about 2 to 5 millimeters thickness of walls which are placed upon each other, until the desired interior diameter has been obtained.

The invention will now be described with reference to the accompanying drawings, showing, by way of example, mandrels in accordance with this invention with cylinders produced by the winding thereon of layers of fabric, or the like. Figure 1 is a cross sectional view of a winding mandrel of the kind described with an insert mounted thereupon, and with an insulating cylinder wound around said insert. Figure 2 illustrates the insert and the insulating cylinder corresponding to Figure 1, showing them withdrawn from the winding mandrel together. Figure 3 shows, by way of exemplification in perspective a winding mandrel and three superimposed inserts and an insulating cylinder wound thereon, large pieces of different sizes being shown cut out or broken out from the insulating cylinder and from the three inserts for the sake of clearness of illustration. Figure 4 is a cross-section through the mandrel with the inserts and the cylinder according to Figure 3.

In Figure 1 of the drawings, 1 indicates the winding mandrel which in this particular embodiment may have a diameter of say 500 millimeters or about 20 inches, 2 is the product obtained by the winding operation which in this particular instance may comprise a cylinder of an interior diameter of 505 millimeters obtained by the winding of sheets of impregnated paper, and adapted for subsequent baking; 3 is the insert, or intermediate layer, which serves for the increase of the diameter of the mandrel so as to be equal to the inner diameter of the finished cylinder. The insert, according to a preferred embodiment of the invention, comprises a cylinder of hard paper of 500 millimeters interior diameter and 2½ millimeters thickness of walls, that is to say with an outer diameter of 505 millimeters, which is equal to the inner diameter of the finished cylinder. The insert is slitted along a line 4 at an inclination to the radial plane. In Figure 2 the finished cylinder is indicated at 2, 3 being the insert still housed therein, while the mandrel 1 has been removed.

In the modification according to Figures 3 and 4, the winding mandrel is likewise indicated at 1 as in Figure 1, that is to say, it is supposed to have a diameter of 500 millimeters; 2' is the finished cylinder which in this case, however, has a diameter of 515 millimeters, so that an annular space of 7½ millimeters width in the radial direction remains between the mandrel and the cylinder. This space is occupied by three inserts, or intermediate layers $3^1$, $3^2$, $3^3$, each having walls of 2½ millimeters thickness, and of which the innermost insert has an inner diameter of 500 millimeters, the next one an interior diameter of 505 millimeters, and the exterior or third insert having an interior diameter of 510 millimeters. Each of said inserts is split open along a line at $4^1$, $4^2$, $4^3$ respectively which runs in the radial plane; and the inserts $3^1$, $3^2$, $3^3$ are preferably so arranged with relation to each other that the slits are staggeringly arranged. The winding mandrel 1 with the three inserts is therefore adapted for the winding of cylinders of 500, 505, 510, and 515 millimeters interior diameter. After the cylinder has been wound on the mandrel comprising the member 1 and one or more of the mandrel elements or inserts engaged thereover, the mandrel 1 is first withdrawn, and then the inserts can be easily removed one after the other. In this connection it is pointed out that in forming any given insert or mandrel element, or insulating cylinder, by winding resin impregnated paper or the like on the mandrel 1, or on a mandrel element or insert previously formed, sticking of the inner layer of the mandrel element or insulating cylinder being formed to the outer face of the mandrel 1 or to a mandrel element engaged thereover, as the case may be, may be prevented in any one of three practicable ways; viz., by applying to the outer face of the mandrel or mandrel element, as the case may be, a suitable lubricant; by placing a thin sheet of unimpregnated paper or other material around the outer face of the mandrel or mandrel element before beginning to wind the impregnated material thereon; or, by employing paper or the like which is treated on only one face with resin, lacquer, varnish or the like and disposing the untreated side of the paper towards the mandrel.

It should, of course, be understood that the invention is by no means restricted to cylinders, but is applicable to other cross sectional shapes as well, particularly to the shapes usually employed for electro-technical purposes, for instance, four-cornered, square and oval shapes, and while the invention has been shown and described herein in connection with what may be considered its preferred embodiments, it will be evident that it is susceptible of other modifications and changes in accordance with varying conditions of application without departing from the spirit and scope of the invention, as defined in the claims hereunto appended.

I claim:—

1. A sectional mandrel for use as a core in producing hollow bodies comprising a plurality of mandrel elements in the form of sleeves adapted for engagement one over another to provide a core of a desired diameter, each sleeve comprising a strip of flexible material wound in superimposed layers and longitudinally slit, the smallest sleeve corresponding in interior cross sectional size and shape to a mandrel over which said sleeve is adapted to be engaged, and each successively larger sleeve corresponding in interior size and shape to the exterior size and shape of the sleeve next smaller in size.

2. A sectional mandrel for use as a core in producing hollow bodies, comprising an inner mandrel element and an outer mandrel element engageable over said inner mandrel element to increase the effective diameter of the mandrel, said outer mandrel element being in the form of a longitudinal slit sleeve composed of superimposed layers of flexible material.

3. A sectional mandrel for use as a core in producing hollow bodies, comprising an inner mandrel element and an outer mandrel element engageable over said inner mandrel element to increase the effective diameter of the mandrel, said outer mandrel element being in the form of a longitudinal slit sleeve composed of superimposed layers of flexible material, said sleeve corresponding interiorly in cross sectional size and shape to the exterior cross sectional size and shape of the inner mandrel element.

In testimony whereof I affix my signature.

RICHARD SCHROEDER.